United States Patent [19]

Helf et al.

[11] Patent Number: 4,773,139

[45] Date of Patent: Sep. 27, 1988

[54] METHOD FOR MANUFACTURING AN ELECTRICAL CAPACITOR

[75] Inventors: Karl-Eduard Helf, Wiesbaden; Guenther Crass, Taunusstein, both of Fed. Rep. of Germany

[73] Assignee: Hoechst Aktiengesellschaft, Frankfurt am Main, Fed. Rep. of Germany

[21] Appl. No.: 922,956

[22] Filed: Oct. 24, 1986

[30] Foreign Application Priority Data

Oct. 31, 1985 [DE] Fed. Rep. of Germany ....... 3538701

[51] Int. Cl.⁴ ............................................... H01G 7/00
[52] U.S. Cl. .................................... 29/25.42; 361/323
[58] Field of Search ............................ 29/25.42; 34/1; 174/14 R, 304, 373; 204/186; 219/281; 361/323

[56] References Cited

U.S. PATENT DOCUMENTS

| | | | |
|---|---|---|---|
| 3,955,127 | 5/1976 | Hunt | 29/25.42 X |
| 4,353,107 | 10/1982 | Decroix et al. | 361/323 |
| 4,363,162 | 12/1982 | Price | 29/25.42 X |
| 4,367,511 | 1/1983 | Crass et al. | 361/313 |
| 4,569,739 | 2/1986 | Klinkowski | 204/186 X |
| 4,622,620 | 11/1986 | Michel | 29/25.42 X |

FOREIGN PATENT DOCUMENTS 1586205 3/1981 United Kingdom .

OTHER PUBLICATIONS

"IEEE Transactions on Electrical Insulation", vol. EI-19, No. 4, Aug. 1984.

*Primary Examiner*—Timothy V. Eley
*Attorney, Agent, or Firm*—Foley & Lardner, Schwartz, Jeffery, Schwaab, Mack, Blumenthal & Evans

[57] ABSTRACT

A method is described by which the residual moisture can be removed from wound capacitors containing dielectric layers of thermoplastic plastic material, the residual moisture being broken down by electrochemical decomposition and the break-down products removed by vacuum. Capacitors which are subjected to this treatment have a longer service life.

19 Claims, No Drawings

METHOD FOR MANUFACTURING AN ELECTRICAL CAPACITOR

BACKGROUND OF THE INVENTION

The present invention relates to a method for manufacturing a wound electrical capacitor with long service life comprising metallic layers conducting the electrical current and dielectric layers of thermoplastic plastic material which do not conduct the electrical current, disposed between said metallic layers. The invention also relates to a capacitor produced according to said method.

The manufacture of wound electrical capacitors comprising alternating metal layers and dielectric layers, for example, of polypropylene and optionally of other polymers, is already known from numerous publications. Reference may be made to European Pat. No. 0,001,525 as representative of all these publications. For reasons of space, recourse has been made to reducing the thickness of the metal layers substantially by depositing the metal in vacuo as extremely thin coatings directly on the dielectric layer of thermoplastic plastic material. As a result of this it was possible to reduce substantially the size of capacitors manufactured with such metallized dielectric films.

However, in the case of capacitors with the extremely thin metal layers produced by evaporation coating, it has been found that extremely undesirable capacitance losses are observed, in particular when the capacitors are used for alternating voltages over a prolonged period. These capacitance losses are the consequence of local destruction of the metallic layer caused by electrochemical corrosion, the metallic conductive aluminum forming the metal layer being converted into non-conductive polycrystalline aluminum oxide. As the metal area available decreases, the capacitance of the capacitor also decreases.

The phenomenon is observable as numerous, virtually circular metal-free sites inside the metallic layer whose frequency and growth rate depend, inter alia, on the magnitude of the operating voltage of the capacitor, on the frequency of the alternating current and on the operating temperature of the capacitor. It is known from an investigation by Taylor published in "IEEE Transactions on Electrical Insulation", Vol. EI-19, No. 4, Aug. 1984, that the corrosion of aluminum in metallized film capacitors is invariably connected with the presence of water or moisture between or in the winding layers of the capacitor under investigation.

SUMMARY OF THE INVENTION

It is therefore an object of the present invention to provide an improved method for the manufacture of a wound electrical capacitor. It is a particular object of the invention to provide such a method which guarantees that not the slightest amount of moisture remains in the interior of the capacitor winding. Another object of the invention is to provide a capacitor which exhibits a lower tendency to irreversible decrease in capacitance than capacitors known hitherto. A further object of the invention is to provide a wound capacitor having a longer life expectancy.

In accomplishing the foregoing objects, there has been provided according to one aspect of the present invention a method for manufacturing a wound electrical capacitor comprising alternating metallic layers and dielectric layers of thermoplastic material, comprising the steps of: rolling up the alternating metallic and dielectric layers of the capacitor, wherein at least one side of said dielectric layer has a surface roughness $R_z$ of not more than about 0.25 $\mu$m, determined in accordance to DIN 4768; breaking down moisture deposited between the layers of the capacitor by electrochemical decomposition into the elements hydrogen and oxygen; and removing the hydrogen and oxygen from the capacitor winding by applying reduced pressure.

According to another aspect of the present invention, there has been provided a wound electrical capacitor having an improved service life, produced according to a method as defined above.

Further objects, features and advantages of the present invention will become apparent from the detailed description of preferred embodiments which follows.

DETAILED DESCRIPTION OF THE PREFERRED EMBODIMENTS

The process according to the invention is characterized by the following combination of features:

(i) after the individual layers forming the capacitor have been rolled up, the moisture deposited in or between the layers is broken down by electrochemical decomposition into the elements hydrogen and oxygen, (ii) the breakdown products hydrogen and oxygen are removed from the capacitor winding by applying a reduced pressure, and (iii) at least one surface of the dielectric layer which does not conduct the electrical current has a surface roughness $R_z$ of at most 0.25 $\mu$m, determined in accordance with DIN 4768.

Within the scope of the method according to the invention films of various thermoplastic plastic materials can be used as dielectric layers, provided they have satisfactory electrical insulating properties. Polyolefins, polyesters, polystyrenes, polyamides and polyvinyl chloride may be used as thermoplastic plastic materials, with polyolefins such as polyethylene or polypropylene and polyesters such as polyethylene terephthalate being preferred. An isotactic polypropylene homopolymer or a copolymer which is composed predominantly of propylene units is used as an especially preferred polymer. Such polymers usually have a melting point of at least about 140° C., preferably of about 150° C. Isotactic polypropylene without additives and having a component soluble in n-heptane of less than 10% by weight, copolymers of ethylene and propylene with an ethylene content of less than 10% by weight, and copolymers of propylene with other $\alpha$-olefins containing four to eight carbon atoms and having a content of said $\alpha$-olefin of less than 10% by weight are typical examples of the preferred thermoplastic polymers.

The preferred thermoplastic polymers typically have a melt flow index in the range of from about 0.5 g/10 min to 8 g/10 min at 230° C. and with a loading of 2.16 kg (DIN 53 735) in particular from about 1.5 g/10 min to 4 g/10 min.

The films of the said polymers are preferably mono- or biaxially stretch-oriented to improve their mechanical properties. In order to guarantee an adequately large dimensional stability of the films, the films may in particular also be heat-fixed. The dielectric layers should be as thin as possible, and their layer thickness is therefore in the range from about 3 to 30 $\mu$m, preferably from about 5 to 20 $\mu$m.

The metallic layer may consist of any suitable metal. Preferred are layers of aluminum, zinc, nickel, gold or silver or of suitable alloys, with aluminum or aluminum-containing alloys being preferred. As suitable metallizing processes, mention may be made of electroplating, sputtering and vacuum deposition, with vacuum deposition being preferred. In order to achieve an especially good adhesion of the metal layer to the surface to be metallized, the surface is subjected beforehand to a corona treatment, i.e., it is exposed to a corona discharge by applying an alternating voltage of about 10,000 V and 10,000 $H_z$.

The thickness of the metal layer lies within the range from about 20 to 600 nm, preferably about 25 to 100 nm.

In the method according to the invention the removal of the moisture deposited in the capacitor winding takes place by electrochemical decomposition with the use of direct current. For this purpose a direct voltage from about 100 to 800 V, in particular from about 300 to 600 V, is applied to the two capacitor electrodes and maintained over a period of about 1 to 500 min, preferably from about 10 to 100 min.

The break-down products hydrogen and oxygen produced in the electrochemical decomposition of the residual moisture are removed in the method according to the invention by applying a reduced pressure (vacuum). It has emerged in practice that a reduced pressure in the range from about 10 to 0.0001 mbar, preferably from 0.1 to 0.0001, and more preferably from about 0.01 to 0.0001 mbar is the best suited for this purpose.

It is important for the method according to the invention that the surface roughness $R_z$ of the dielectric layer, determined in accordance with DIN 4768, on the side of the dielectric layer on which the metal layer is deposited does not exceed the value of about 0.25 μm. It is preferable for the surface roughness $R_z$ to be between about 0.1 and 0.25 μm. The adjustment of the surface roughness, for example, in the case of polypropylene, normally takes place during the manufacture of the films by thermally influencing the morphology ($\beta$-$\alpha$-crystallite transformation) of the polypropylene in a controlled manner. Suitable processes for doing this are described, for example, in German Pats. Nos. 2,740,237 and 2,942,298.

The method described above in detail will be explained below in still further detail by means of examples. For the examples, wound capacitors containing dielectric layers of polypropylene and metal layers of aluminum were manufactured. The polypropylene had a constituent soluble in n-heptane of 5.5% by weight and a melt flow index of 1.8 g/10 min at 230° C. and a loading of 2.16 kg . The dielectric layers had a thickness of 8 μm and were coated with aluminum under high vacuum.

The capacitance of all the capacitors manufactured was initially 8 μF. All the capacitors were loaded with an AC voltage of 440 V at a temperature of 85° C. over a period of 500 h, and then the capacitance losses were measured.

EXAMPLE 1

A polypropylene film with a surface roughness $R_z$ on both sides equal to 0.20 μm was used as the dielectric layer. The residual moisture was removed from the wound capacitor by applying a DC voltage of 400 V over a period of 40 min at a reduced pressure of $10^{-2}$ mbar. The results of the capacitance measurements are summarized in the table at the end of the description.

COMPARISON EXAMPLES (C1) A polypropylene film with a surface roughness $R_z$ on both sides equal to 0.40 μm was used as the dielectric layer, and the moisture was not removed.

(C2) A polypropylene film with a surface roughness $R_z$ on both sides equal to 0.20 μm was used as the dielectric layer, and the moisture was not removed.

(C3) A polypropylene film with a surface roughness $R_z$ as in (C1) was used as the dielectric layer, and the moisture was removed by applying a vacuum ($10^{-2}$ mbar) for 40 min.

(C4) A polypropylene film with a surface roughness $R_z$ as in (C2) was used as the dielectric layer, and the moisture was removed by applying a vacuum ($10^{-2}$ mbar) for 40 min.

(C5) A polypropylene film with a surface roughness $R_z$ as in (C1) was used as the dielectric layer, and the moisture was removed by applying a DC voltage of 400 V over a period of 40 min at a reduced pressure of $10^{-2}$ mbar.

TABLE

| Foil thickness 8 μm<br>Capacitance 8 μF | Capacitance losses (%)<br>after 500 h at 85° C.<br>with 440 V load |
|---|---|
| (C1)<br>rough film $R_z$ = 0.40 μm | 7 |
| (C2)<br>smooth film $R_z$ = 0.20 μm | 4 |
| (C3)<br>rough film as in (C1), evacuated | 6 |
| (C4)<br>smooth film as in (C2), evacuated | 4 |
| (C5)<br>rough film as in (C1), electrical water removal under vacuum | 3 |
| Example 1<br>smooth film as in (C2), electrical water removal under vacuum | 1 |

The examples show clearly that capacitors manufactured by the method according to the invention have improved life expectancy compared with capacitors which are not manufactured by the method according to the invention.

What is claimed is:

1. A method for manufacturing a wound electrical capacitor comprising alternating metallic layers and dielectric layers of thermoplastic material, comprising the steps of:
   (i) rolling up the alternating metallic and dielectric layers of the capacitor, wherein at least one side of said dielectric layers has a surface roughness $R_z$ of not more than about 0.25 μm, determined in accordance to DIN 4768;
   (ii) breaking down water moisture contained between the layers of the capacitor by electrochemical decomposition into the elements hydrogen and oxygen; and
   (iii) removing the hydrogen and oxygen from the capacitor winding by applying reduced pressure.

2. A method as claimed in claim 1, wherein said step of breaking down moisture comprises applying a DC voltage within the range of about 100 to 800 V to electrodes of the capacitor to cause the electrochemical decomposition of the moisture.

3. A method as claimed in claim 2, wherein the voltage lies within the range of about 300 to 600 V.

4. A method as claimed in claim 1, wherein the DC voltage is applied over a period of about 1 to 500 min.

5. A method as claimed in claim 4, wherein the DC voltage is applied over a period of about 10 to 100 min.

6. A method as claimed in claim 1, wherein said reduced pressure lies within the range from about 10 to 0.0001 mbar.

7. A wound electrical capacitor having an improved service life produced according to a method as claimed in claim 1.

8. A capacitor as claimed in claim 7, wherein said dielectric layers comprise propylene polymer film having a thickness within the range from about 3 to 30 $\mu$m.

9. A capacitor as claimed in claim 8, wherein said propylene polymer film has a thickness within the range from about 5 to 20 $\mu$m.

10. A capacitor as claimed in claim 8, wherein said metallic layer comprises an aluminum layer produced by vacuum deposition on the surface of said propylene polymer film.

11. A capacitor as claimed in claim 10, wherein said metallic layer has a thickness within the range from about 20 to 600 nm.

12. A capacitor as claimed in claim 11, wherein said thickness lies within the range from 25 to 100 nm.

13. A capacitor as claimed in claim 8, wherein the surface roughness $R_z$ of said propylene polymer film lies within the range from about 0.1 to 0.25 $\mu$m.

14. A capacitor as claimed in claim 7, wherein said dielectric layers comprise ethylene terephthalate polymer film having a thickness within the range from about 2 to 25 $\mu$m.

15. A capacitor as claimed in claim 14, wherein said ethylene terephthalate polymer film has a thickness within the range from about 3 to 15 $\mu$m.

16. A capacitor as claimed in claim 15, wherein the surface roughness $R_z$ of said ethylene terephthalate polymer film lies within the range from about 0.1 to 1 /$\mu$m.

17. A capacitor as claimed in claim 14, wherein said metallic layer comprises an aluminum layer produced by vacuum deposition on the surface of said ethylene terephthalate polymer film.

18. A capacitor as claimed in claim 17, wherein said metallic layer has a thickness within the range from about 20 to 600 nm.

19. A capacitor as claimed in claim 17, wherein said thickness lies within the range from about 25 to 100 nm.

* * * * *